Aug. 10, 1965    JOHN R. OISHEI ETAL    3,199,787
WINDSHIELD WASHER SYSTEM
Filed Aug. 26, 1963    2 Sheets-Sheet 1
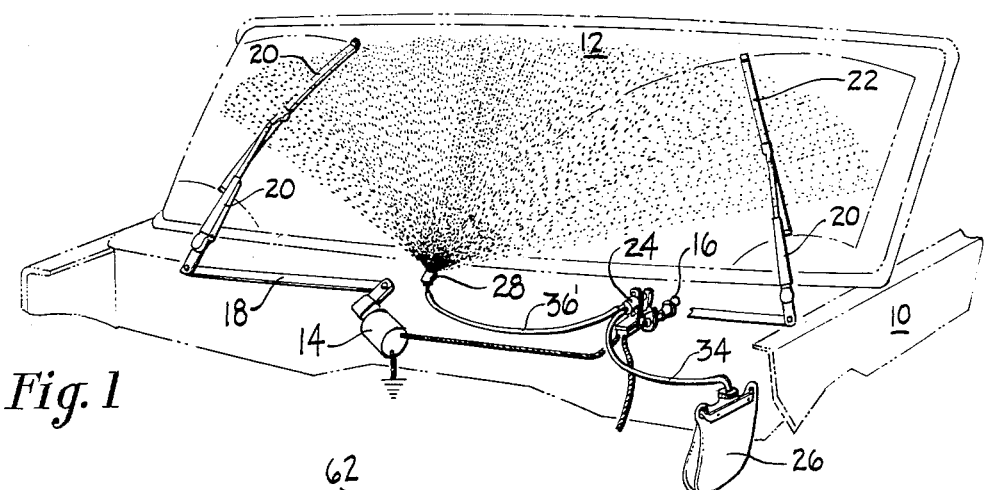
Fig. 1
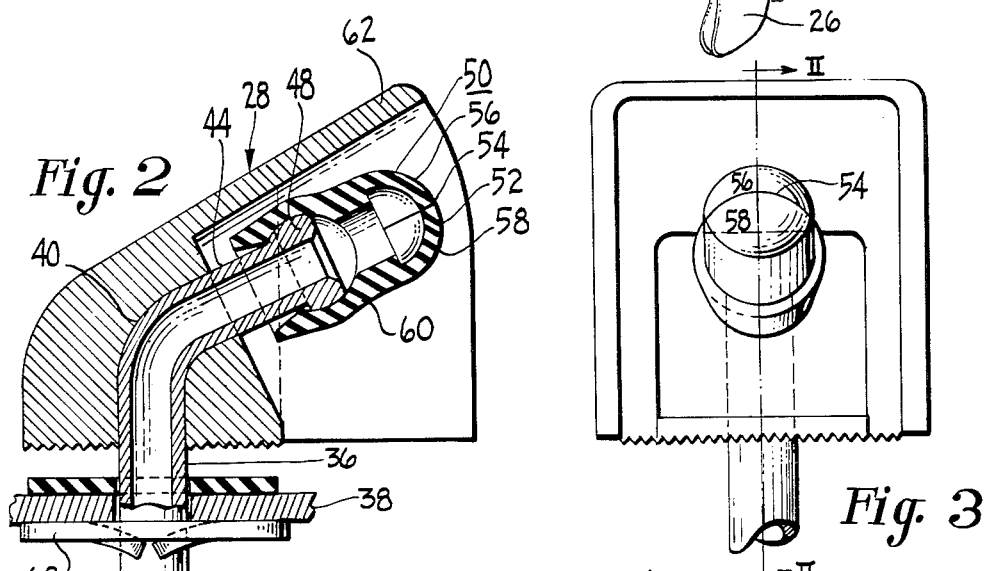
Fig. 2
Fig. 3
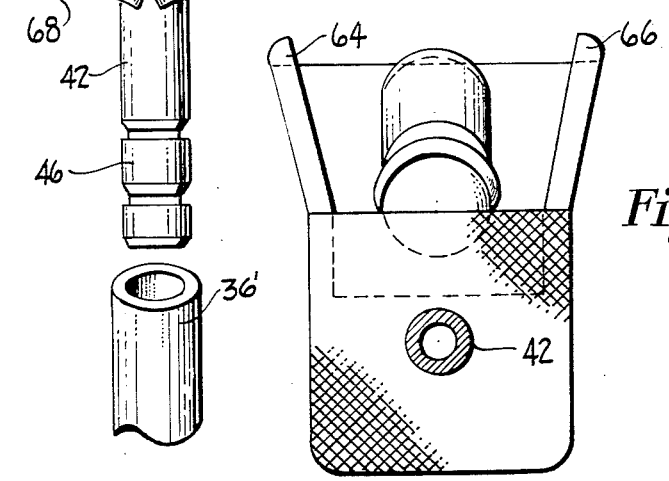
Fig. 4
INVENTOR.
JOHN R. OISHEI and
BY ANTHONY C. SCINTA
E. Herbert Liss
ATTORNEY.

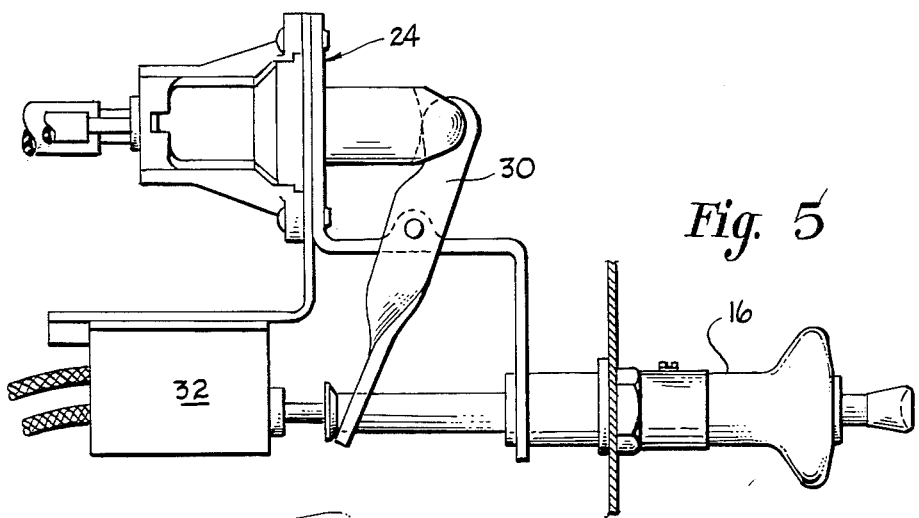
Fig. 5
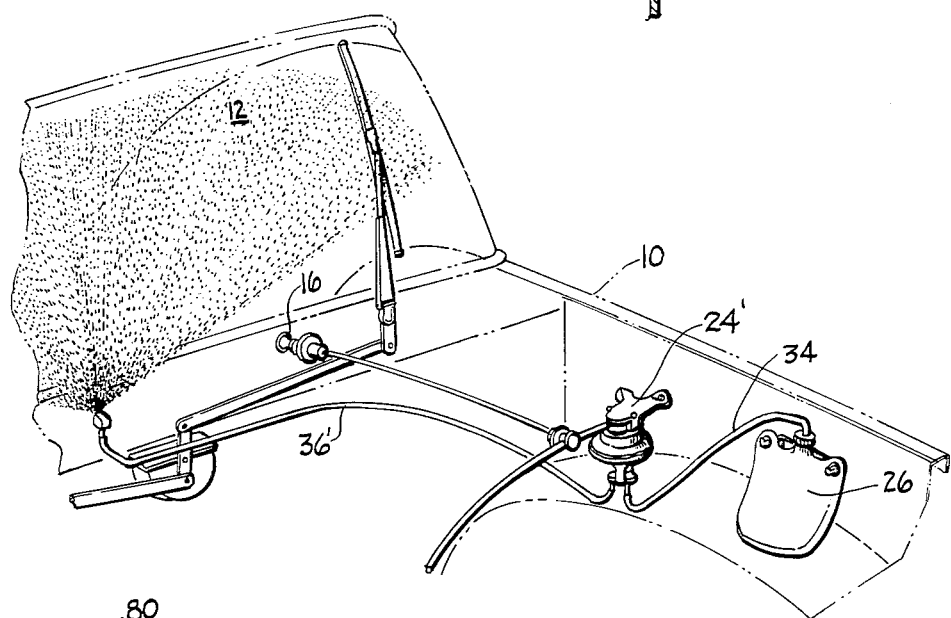
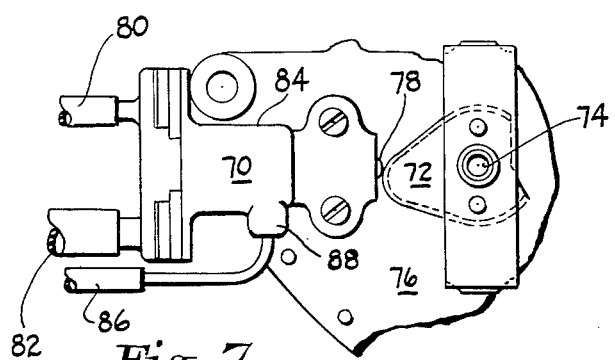
Fig. 6
Fig. 7
INVENTOR.
JOHN R. OISHEI and
ANTHONY C. SCINTA
BY
*E. Herbert Liss*
ATTORNEY.

United States Patent Office 3,199,787
Patented Aug. 10, 1965

3,199,787
WINDSHIELD WASHER SYSTEM
John R. Oishei, Buffalo, and Anthony C. Scinta, Hamburg, N.Y., assignors to Trico Products Corporation, Buffalo, N.Y.
Filed Aug. 26, 1963, Ser. No. 304,474
3 Claims. (Cl. 239—284)

The present invention relates to an improved fluid dispensing system for projecting finely divided particles of solvent onto a windshield for wetting the vision area of a windshield and to an improved discharge nozzle for such a system.

Present windshield cleaning systems utilize washer nozzles which project a solid stream of fluid, generally through a pair of restricted passages to the central portion of the wiping pattern of each of two windshield wiper blades. Such a stream of fluid results in a major flow away of fluid onto the cowl, wasting the fluid without serving the intended purpose of clearing the windshield. This substantial waste of windshield washer solvent results in undue expense and frequent refilling of the solvent reservoir. Another disadvantage of this type of windshield washer solvent ejection is that proper distribution of solvent over the wiped area is difficult to attain and the initial wipes result in vision obscuring streaking on the windshield.

In order to efficiently clean a windshield, it is essential that the wetting agent remain suspended on the windshield in advance of the blade until the blade sweeps across the portion to be cleaned. When wetted with divided wetting deposits that do not ricochet or run off, but remain on the windshield as suspended separated particles, the contacting rubber wiping lip becomes more effective in acting to scrub off the grime. The separated particles provide sufficient surface friction between the wiper element and the wetted glass to produce a component of blade cling for obtaining optimum scrubbing action. A system which projects a solid stream onto the windshield, requiring fluid distribution across the vision area by blade action hinders the scrubbing effectiveness of the blade during the period in which the blade is acting to distribute the fluid.

Fully distributed wetting of the surface to be cleaned further tends to dissolve or loosen the grime in advance of scrubbing by the blade.

To overcome these problems and to produce complete cleaning of the windshield more quickly or with fewer wipes, a wetting pattern which covers the entire vision area of the windshield with finely divided particles of non-aerated solvent separated from each other is desirable. These fine particles cling to the glass due to surface tension and remain separated to provide improved vision until they are merged by the sweep of the blade which thereby washes and wipes the surface dry. Such a distribution of particles conserves the wetting agent and eliminates the need of prolonged dry wiping. The windshield cleaning system of the present invention with its improved nozzle is highly effective in providing a discharge of finely divided non-aerated fluid particles and even a single cycle of wiper operation has been found highly effective to produce cleaning of the surface of dust and light deposits of grime from wheel spray. This is accomplished with a single centrally located nozzle. Furthermore, with the improved nozzle of the present invention, clogging of the nozzle is eliminated because the nozzle remains in its normally closed position, preventing accumulation of foreign substances in the orifice when the washer is not in operation. Because the nozzle accumulates solvent under substantial pressure prior to discharge, when discharging it becomes self-cleaning due to the high pressure under which solvent is ejected and to the relatively large opening of the jet in its distended position. The vibrating action of the orifice during operation causes the break-up of the fluid into fine particles.

The principal object of the present invention is to provide an improved washer system which projects onto a windshield a wide fan-shaped spray pattern of finely divided deposits of washer solvent separated from each other so that vision during the wetting operation is not obscured.

Another object of the invention is to provide an improved washer system utilizing a high pressure pump and a pressure accumulating nozzle which is caused to vibrate by action of repeated pressure accumulation and subsequent solvent discharge during each cycle of pump operation.

A further object of the invention is to provide an improved washer system which projects finely divided particles of washer solvent onto the entire visual area of the windshield utilizing only a single nozzle, which particles remain separated and suspended on the surface of the windshield due to surface tension and which become merged only by the blade travel across the wipe pattern and disappear.

Other objects and advantages of the invention will become apparent from the following detailed description taken in connection with the accompanying drawings in which:

FIG. 1 is a partial perspective view of a motor vehicle incorporating the invention;

FIG. 2 is a sectional view taken on line II—II of FIG. 3 illustrating the nozzle of this invention;

FIG. 3 is a front elevational view of the nozzle assembly of this invention;

FIG. 4 is a bottom elevational view of the nozzle assembly of this invention;

FIG. 5 illustrates a coordinated windshield washer control incorporating one form of pumping element which may be utilized with the present invention;

FIG. 6 is a partial perspective view of a motor vehicle incorporating the washer system of the present invention utilizing another form of pumping unit; and FIG. 7 illustrates another form of pumping unit which may be utilized with the washer system of this invention.

Briefly, the washer system of this invention comprises a reservoir, a unique discharge nozzle, a pump and conduit means connecting the reservoir, the pump and the discharge nozzle. The discharge nozzle is a tubular member having a closed end with a transverse opening elastically biased to a normally closed position. The body portion of the tubular nozzle has thickened wall portions to more firmly bias the transverse opening to its closed position. When the pump operates, washer solvent is accumulated in the nozzle until sufficient fluid pressure is developed within the nozzle to cause opening of the transverse orifice, resulting in a discharge of solvent. This discharge instantaneously causes reclosing of the orifice and during a single stroke of the relatively high pressure pump, the orifice is repeatedly opened and closed, resulting in a vibrating orifice. The vibrations break up the fluid into finely divided solvent particles which are projected onto the windshield and remain suspended thereon separated from one another by surface tension until merged by the travel of the wiper blades. Particles are distributed over the entire vision area of the windshield due to the elongate shape of the orifice and the high pressure at which they are projected.

In FIG. 1 there is shown a partial view of a motor vehicle 10 having mounted thereon a windshield 12 in a conventional manner. Mounted on the fire wall of the vehicle is a wiper motor 14. The motor 14 is shown by way of example as being an electric motor, but any suitable or desirable type of motor as, for example, hydraulic or vacuum may be employed. A control 16 is mounted on the vehicle dashboard and is connected by suitable electric circuitry to the motor 14 for energizing the motor. A suitable linkage system 18 is provided for transmitting motion from the wiper motor to a pair of wiper arms 20 in a conventional manner. The wiper arms 20, in turn, mount wipers 22. As is well understood in the art, when control 16 is manipulated, wiper motor 14 is placed in operation and causes wipers 22 to oscillate back and forth across windshield 12.

A pumping mechanism 24, as illustrated in FIGS. 1 and 5, mounted on the control 16 and forming a part thereof, may be utilized to draw solvent from the reservoir 26 through the nozzle 28 for projection onto the windshield 12. The particular pump illustrated is described in detail in application Serial No. 269,654 by John R. Oishei and Martin Hitzer, filed April 1, 1963. This pump is coordinated with the wiper motor control 16. Through the use of a force multiplying lever 30, fluid is projected at relatively high pressure while at the same time switch 32 is operated to energize the wiper motor. The intake port of the pump is connected through a conduit 34 to reservoir 26 and the discharge port of the pump is connected through a conduit 36' to the discharge nozzle assembly 28. Preferably a single nozzle assembly 28 located substantially centrally on the cowl is employed. It will of course be understood that although a particular pumping mechanism is shown and described for the purpose of illustration, in accordance with the broadest aspects of the invention, other and different suitable high pressure pumping mechanisms may be utilized.

The nozzle assembly 28, best seen in FIG. 2, comprises a tubular conduit 36 extending through a central portion 38 of the cowl of the vehicle. The conduit 36 is suitably angled at 40 to provide a downwardly directed portion 42 and an outwardly directed portion 44. The outwardly directed portion extends upwardly and toward the windshield. At the lower end of the downwardly directed portion the tubular conduit 36 is provided with a suitably formed coupling portion 46 for fluid tight connection to conduit 36. At its outer end the conduit 36 is formed with an enlarged portion 48 of substantially spherical configuration. The nozzle assembly 28 includes a nozzle 50 of rubber-like elastomeric material. The nozzle 50 is of substantially tubular form and has a closed end 52, which may be of curvilinear configuration, with a transverse slit 54 therein forming lips 56 and 58. A tubular body portion 60 has side walls of greater thickness than the thickness of the lips 56 and 58 to provide a greater biasing force for biasing the lips 56 and 58 to close the slit 54. The enlarged portion 48 of conduit 36 is of larger diameter than the inner diameter of the body portion 60 of nozzle 50. This provides a force fit between the nozzle 50 and the conduit 36 to prevent the nozzle from becoming disengaged therefrom when pressure is built up within the nozzle assembly. This enlarged portion also enhances the biasing effect to maintain the slit 54 in its normally closed condition. It can thus be seen that substantial pressure is required to open lips 56 and 58 for discharge of fluid through slit 54 and that the resiliency of the nozzle and its unique construction will cause the nozzle to be repeatedly biased to closed position during a single pumping action. This will effect vibration of the lips 56 and 58 causing the lips to break up the solvent into finely divided particles. The transverse slit, being of greater length than width, as well as the arcuate shape of the lips 56 and 58, will cause a wide fan-shaped pattern of projected solvent.

In order to control the angular extent of the solvent projection pattern and to protect the nozzle adjustment, a shield 62 is provided which encloses the nozzle 50 and includes flared side walls 64 and 66. The disposition of the housing with respect to the nozzle 50 may be adjusted to control the solvent projection pattern. The shield 62 is knurled on its lower side which lies adjacent the cowl of the vehicle to prevent displacement thereof. Disposed intermediate the housing 62 and the adjacent cowl portion of the vehicle is a resilient washer 66 and on the underside of the cowl is a suitable push-on type fastener 68 for maintaining the nozzle in position on the cowl.

The operation of the washer system of this invention should now be apparent. When the control 16 is actuated to cause the pump to operate, fluid is withdrawn from the reservoir 26 through the conduit 34 and discharged through the conduit 36' to the nozzle 28. The fluid is sequestered in the nozzle 50 until sufficient pressure develops to part the lips 56 and 58, at which time fluid projection takes place, thus resulting in a pressure drop within the nozzle 50, causing the resilient biased lips 56 and 58 to again close the slit 54. It should be realized that this action takes place extremely rapidly, resulting in continuous fluid projection through the vibrating lips, thus causing break-up of the fluid into finely divided non-aerated particles of solvent. The particles are projected in a fan-shaped pattern encompassing the entire vision area of the windshield with the particles disposed separated from each other. Because of the extremely small dimensions of the particles, they remain suspended in position on the windshield without merging and without drain-back until they are caused to merge by travel of the wiper blades. It can be seen that an extremely small amount of fluid is required during each cleaning operation because the particles are of small dimensions and widely distributed.

Other suitable types of pumps may be utilized in accordance with the broadest aspects of this invention. Another example of a pump is shown in the embodiment of the invention illustrated in FIG. 6 wherein a pump of the type described in detail in Patent No. 3,097,608 by R. A. Deibel and W. C. Riester, issued July 16, 1963, is utilized. The pump 24' of this embodiment is a type which operates in repeated cycles so long as the control 16' remains in the "on" position.

A still further form of pump is shown in FIG. 7 and is described in application Serial No. 304,431 by Anthony R. D'Alba filed August 26, 1963. This is a springless type pump 70 actuated in one direction by a movable element or cam 72 on the output transmission system of the wiper motor. As shown, the cam is mounted on the output shaft 74 of the wiper motor 76. The cam drives a piston rod or plunger 78 on its discharging stroke which moves a piston, not shown, to discharge fluid through a discharge conduit 80. An energy actuating biasing source provides a force to return the piston and to bias it against the cam 72 with spring-like action on the intake stroke whereby fluid is drawn from the reservoir through intake conduit 82. The energy source for biasing the piston on an intake stroke may be a vacuum source communicating with the pump housing 84 through a conduit 86 and a port 88. A solenoid or other source of energy for producing a force in the direction of the intake stroke may be utilized in accordance with the broadest aspects of the invention.

It should now be apparent that an improved washer system has been provided together with an improved nozzle for such a washer system. Certain specific embodiments of the invention have been shown and described for the purpose of illustration, but it will be apparent that various modifications and other embodiments are possible within the scope of the invention. For example, other and different types of pumps may be employed. Other and different types of shields may be employed. It is to be understood, therefore, that the invention is not

What is claimed is:

1. A nozzle assembly for discharging finely divided particles over a relatively wide area of a windshield comprising a conduit, a nozzle of elastomeric material mounted at the end of said conduit and means for sheltering said nozzle to protect against nozzle maladjustment, said nozzle including a tubular body portion and a closed end portion, said means for sheltering being open adjacent said closed end portion of the nozzle, said closed end portion of the nozzle having a substantially transversely extending slit of a length sufficient to provide wetting of substantially the entire wiping pattern, said nozzle being normally biased to closed position and said slit being open when subjected to increased fluid pressure, said conduit having an enlarged diameter adjacent said end, said enlarged diameter being of greater dimension than the inner diameter of said tubular portion for retaining and stressing said nozzle to effect biasing of said slit to closed position and said conduit being of material and relative to said nozzle.

2. A nozzle assembly for discharging finely divided fluid particles over a relatively wide area of a windshield comprising a conduit, a nozzle of elastomeric material mounted at the end of said conduit and means for sheltering said nozzle, said nozzle including a tubular body portion and a closed hollow spherical end portion, said means for sheltering being open adjacent said closed end portion of the nozzle, said closed end portion having an elongated arcuate slit normally biased to closed position, open when subjected to increased fluid pressure, said conduit having an enlarged diameter portion of substantially spherical configuration adjacent said end, said spherical portion being of greater diameter than the inner diameter of said tubular portion for retaining and stressing said nozzle to effect biasing of said arcuate slit to closed position, said tubular portion having a greater wall thickness than said closed end portion and said closed end portion having a greater maximum inner diameter than said tubular portion.

3. A windshield washer system adapted to be mounted on a body portion of a motor vehicle, said washer system including a reservoir, a nozzle assembly adjacent a windshield and pump means for discharging fluid under pressure from said reservoir through said nozzle assembly to said windshield, said nozzle assembly comprising a conduit communicating with said pump means, a nozzle of elastomeric material mounted at the free end of said conduit and means for sheltering said nozzle, said nozzle including a tubular body portion and a closed end portion, said means for sheltering having an opening on its side adjacent said closed end portion fan-shaped in both transverse and longitudinal sections, said closed end portion of said nozzle having an elongated, substantially transverse slit of sufficient length to project a wide shower of fluid particles for wetting the entire wiping pattern, said nozzle being normally biased to closed position, said slit being open when subjected to increased fluid pressure, said conduit including means projecting laterally adjacent its free end for retaining and stressing said nozzle to effect biasing of said transverse slit to closed position, said lateral projecting means extending laterally to a dimension greater than the inner diameter of said tubular portion and being of material rigid relative to said nozzle.

References Cited by the Examiner
UNITED STATES PATENTS

| | | | |
|---|---|---|---|
| 2,061,124 | 11/36 | Walther | 222—490 |
| 2,114,558 | 4/38 | Dismukes | 239—284 |
| 2,197,672 | 4/40 | Winters | 222—490 |
| 2,373,555 | 4/45 | Folke | 239—534 |
| 2,634,166 | 4/53 | Sacchini | 239—284 |
| 2,667,992 | 2/54 | Hammond et al. | 222—490 |
| 2,703,259 | 3/55 | Neufeld | 239—884 |
| 2,835,916 | 5/58 | Mittag et al. | 239—284 |
| 3,008,649 | 11/61 | Bock et al. | 239—284 |
| 3,033,470 | 5/62 | Choitz | 239—601 |

FOREIGN PATENTS

| | | |
|---|---|---|
| 339,897 | 8/21 | Germany. |
| 913,127 | 12/62 | Great Britain. |

EVERETT W. KIRBY, *Primary Examiner.*

UNITED STATES PATENT OFFICE
CERTIFICATE OF CORRECTION

Patent No. 3,199,787                            August 10, 1965

John R. Oishei et al.

It is hereby certified that error appears in the above numbered patent requiring correction and that the said Letters Patent should read as corrected below.

Column 3, line 21, for "Martin Hitzer" read -- Martin Bitzer --; column 5, line 23, for "material and" read -- material rigid --.

Signed and sealed this 1st day of February 1966.

(SEAL)
Attest:

ERNEST W. SWIDER                            EDWARD J. BRENNER
Attesting Officer                               Commissioner of Patents